Nov. 29, 1932.   H. D. CHURCH   1,889,399
SPRING CONNECTION FOR VEHICLES
Filed April 17, 1929

INVENTOR
HAROLD D. CHURCH
BY
R M Cooper
ATTORNEY

Patented Nov. 29, 1932

1,889,399

UNITED STATES PATENT OFFICE

HAROLD D. CHURCH, OF CLEVELAND, OHIO, ASSIGNOR TO THE WHITE MOTOR COMPANY, OF CLEVELAND, OHIO, A CORPORATION OF OHIO

SPRING CONNECTION FOR VEHICLES

Application filed April 17, 1929. Serial No. 355,716.

This invention relates to spring connections for vehicles.

It is an object of this invention to provide a spring connection which comprises positive and reliable means for compensating for side wear.

It is a further object of this invention to provide a connection of durable construction which is economic of manufacture and maintenance.

Other objects will hereinafter appear.

The invention itself will be more readily understood by the description of the practical embodiments illustrated in the accompanying drawing in which.

Figures 1, 2:
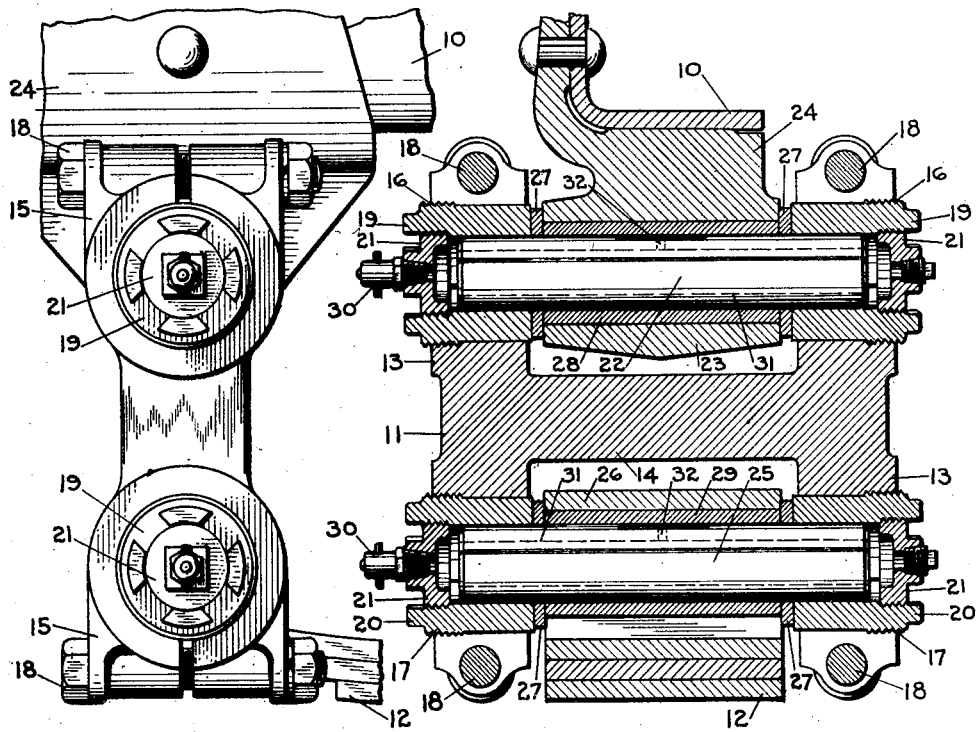
Figure 1 is a side elevation of a spring shackle.
Figure 2 is a vertical section of the shackle shown in Figure 1.

Referring to Figures 1 and 2 of the drawing, the numeral 10 indicates the frame side rail of automobile to which there is attached by means of a spring shackle 11 one end of a spring 12.

The shackle 11 is H-shaped in front elevation and comprises side members or arms 13 maintained in rigid spaced relation by means of an integral connecting member 14. The arms 13 are provided with split end portions 15, and with upper and lower aligned screw-threaded apertures 16 and 17, respectively, which join with the dividing slots of the end portions 15. Mounted in and extending between the slot-separated parts of each end portion 15 there is a bolt 18 the alternate tightening and loosening of which will effect contraction and expansion of the adjacent aperture.

The apertures 16 and 17 receive externally threaded bushings 19 and 20, respectively, which are provided at their outer ends with internal screw-threads for reception of thread plugs 21. These bushings are clamped in place by means of the bolts 18.

Mounted in the bushing 19 there is a headless cylindrical pin 22 which extends through the eye 23 of a frame-attached member 24, and mounted in the bushings 20 there is a similarly constructed pin 25 which extends through the eye 26 of the spring 12.

As clearly shown in the drawing, washers 27 are introduced between the inner ends of bushings 19 and 20 and the adjacent surfaces of the eyes 23 and 26. The eyes themselves are provided with rigidly associated bushings 28 and 29 respectively.

The pin 22 is loose within the bushings 19 and the bushing 28, and is capable of both rotary and lateral movement with respect to either or both. The pin 25 is in like manner floatable within the bushings 20 and the bushing 29.

To adjust for side wear, the bolts 18 are loosened and the bushings 19 and 20 turned to adjusted positions. As will be readily apparent, the threaded engagement of bushings 19 and 20 with walls of the apertures 16 and 17 permits extremely small accurate adjustments.

It is to be noted that the bushings 19 and 20 are formed with unthreaded surfaces adjacent their inner ends which engage like surfaces within the apertures 16 and 17. This construction relieves the threads of the bushings and apertures from strain, and thereby prevents crushing or other mutilation of the threads.

The moving parts of the connection are lubricated by lubricant introduced into the bores of left-hand bushings 19 and 20 through suitable fittings 30 mounted in the plugs 21. As clearly shown in Figure 2, the pins 22 and 25 are formed with passages 31 and 32 which permit the lubricant to flow into the bores of the right-hand bushings 19 and 20, and onto the wearing surfaces of the bushings 28 and 29.

Figure 3:
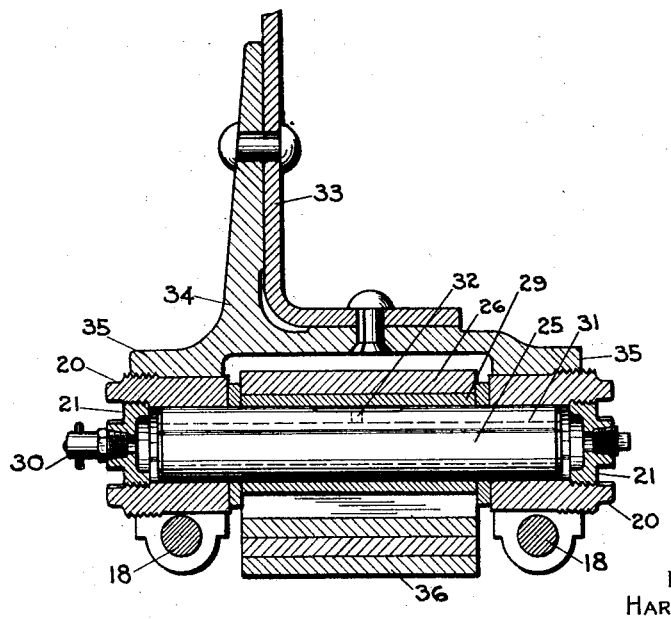
Figure 3 is a vertical section of another form of spring connection.

Referring now to Figure 3 of the drawing, in which facsimiles of parts shown in Figures 1 and 2 are indicated by like reference numerals, the numeral 33 indicates the side rail of a vehicle to which there is rigidly affixed an angle member 34. The member 34 is formed with depending arms 35, and is attached to a spring 36 by means of the same construction which connects the shackle 11 to the spring 12.

Although the foregoing description is necessarily of a detailed character, in order that the invention may be completely set forth, it is to be understood that specific terminology is not intended to be restrictive or confining, and that various rearrangement of parts and modifications of structural details may be resorted to without departing from the spirit or scope of the invention.

I claim as my invention:

A mechanism for connecting one end of a spring to the frame of a vehicle comprising an eye on one of the aforesaid members, a pair of rigidly connected arms attached to the other of the aforesaid members, screw-threaded bushings adjustably mounted in screw-threaded apertures formed in said arms, means for adjustably clamping said bushings within the aforesaid apertures, and a pin floating in said bushings and extending through the aforesaid eye, said bushings having unthreaded portions which bear against unthreaded portions of the interior walls of the aforesaid apertures.

In testimony whereof I hereunto affix my signature.

HAROLD D. CHURCH.